(12) United States Patent
White et al.

(10) Patent No.: US 8,352,370 B1
(45) Date of Patent: Jan. 8, 2013

(54) SYSTEM AND METHOD FOR UNIVERSAL INSTANT CREDIT

(75) Inventors: Tanya M. White, Magnolia, DE (US); William F. Mann, III, Avondale, PA (US)

(73) Assignee: JPMorgan Chase Bank, N.A., New York, NY (US)

(*) Notice: Subject to any disclaimer, the term of this patent is extended or adjusted under 35 U.S.C. 154(b) by 29 days.

(21) Appl. No.: 13/108,345

(22) Filed: May 16, 2011

Related U.S. Application Data

(60) Provisional application No. 61/468,409, filed on Mar. 28, 2011.

(51) Int. Cl.
*G06Q 40/00* (2012.01)

(52) U.S. Cl. ............................... 705/44; 705/38; 705/39

(58) Field of Classification Search .................... 705/38, 705/39, 44
See application file for complete search history.

(56) References Cited

U.S. PATENT DOCUMENTS

| | | |
|---|---|---|
| 5,787,156 A | 7/1998 | Katz |
| 5,870,721 A | 2/1999 | Norris |
| 5,898,762 A | 4/1999 | Katz |
| 5,917,893 A | 6/1999 | Katz |
| 5,940,811 A | 8/1999 | Norris |
| 6,105,007 A | 8/2000 | Norris |
| 6,144,948 A | 11/2000 | Walker et al. |
| 6,324,524 B1 | 11/2001 | Lent et al. |
| 6,386,444 B1 | 5/2002 | Sullivan |
| 6,405,181 B2 | 6/2002 | Lent et al. |
| 6,516,416 B2 | 2/2003 | Gregg et al. |
| 6,556,979 B1 | 4/2003 | Liu et al. |
| 6,718,313 B1 | 4/2004 | Lent et al. |
| 6,745,938 B2 | 6/2004 | Sullivan |
| 6,795,812 B1 | 9/2004 | Lent et al. |
| 6,877,656 B1 | 4/2005 | Jaros et al. |
| 6,999,943 B1 | 2/2006 | Johnson et al. |
| 7,006,983 B1 | 2/2006 | Packes, Jr. et al. |
| 7,270,004 B2 | 9/2007 | Dickinson et al. |
| 7,302,719 B2 | 12/2007 | Jaros et al. |

(Continued)

FOREIGN PATENT DOCUMENTS

WO 0186524 11/2001

OTHER PUBLICATIONS

Francine Schwadel, Sears Introduces Rapid-Credit Program to Woo Holders of Major Bank, Wall Street Journal (Eastern Edition), p. B 5, Dated Feb. 21, 1990, New York, NY 2 pages.

(Continued)

*Primary Examiner* — Jagdish Patel
*Assistant Examiner* — Sara C Hamilton
(74) *Attorney, Agent, or Firm* — Hunton & Williams LLP

(57) ABSTRACT

Systems and methods for universal instant credit are disclosed. In one embodiment, a method of offering a financial instrument to a customer includes (1) using a computer processor, an issuer providing a customer with an application for a financial instrument; (2) the issuer receiving from the customer a completed application for the financial instrument; (3) using the computer processor, the issuer determining whether to approve the customer for the financial instrument; (4) using the computer processor, the issuer transmitting a first portion of an account identifier to a merchant; and (5) using the computer processor, the issuer transmitting a second portion of the account identifier to the customer. The financial instrument may be a credit card, a stored value card, a line of credit, etc.

20 Claims, 9 Drawing Sheets

U.S. PATENT DOCUMENTS

| | | | |
|---|---|---|---|
| 7,370,004 B1 | 5/2008 | Patel et al. | |
| 7,387,238 B2 * | 6/2008 | Foss et al. | 235/380 |
| 7,398,253 B1 * | 7/2008 | Pinnell | 705/66 |
| 7,401,731 B1 | 7/2008 | Pletz et al. | |
| 7,426,530 B1 | 9/2008 | Rosko et al. | |
| 7,606,770 B2 * | 10/2009 | Pinnell | 705/66 |
| 7,640,183 B1 | 12/2009 | Burns | |
| 7,676,425 B1 | 3/2010 | Noles | |
| 7,698,398 B1 | 4/2010 | Lai | |
| 7,720,764 B2 * | 5/2010 | Emerson et al. | 705/44 |
| 7,885,890 B2 | 2/2011 | Haertel | |
| 7,953,663 B1 | 5/2011 | LeKachman | |
| 2001/0037289 A1 | 11/2001 | Mayr et al. | |
| 2002/0002495 A1 | 1/2002 | Ullman | |
| 2002/0040312 A1 | 4/2002 | Dhar et al. | |
| 2002/0046089 A1 | 4/2002 | Zorn | |
| 2002/0082962 A1 * | 6/2002 | Farris et al. | 705/35 |
| 2002/0120537 A1 | 8/2002 | Morea et al. | |
| 2003/0040964 A1 | 2/2003 | Lacek | |
| 2003/0046589 A1 | 3/2003 | Gregg | |
| 2003/0182247 A1 | 9/2003 | Mobed | |
| 2004/0019563 A1 | 1/2004 | Sines et al. | |
| 2004/0172358 A1 | 9/2004 | Lent et al. | |
| 2004/0193539 A1 | 9/2004 | Sullivan | |
| 2005/0004864 A1 | 1/2005 | Lent et al. | |
| 2005/0097033 A1 | 5/2005 | Pretell et al. | |
| 2005/0097036 A1 | 5/2005 | White et al. | |
| 2005/0125292 A1 | 6/2005 | Kassab et al. | |
| 2005/0251470 A1 | 11/2005 | Sullivan | |
| 2006/0059085 A1 * | 3/2006 | Tucker | 705/38 |
| 2006/0129456 A1 | 6/2006 | Walker et al. | |
| 2008/0097925 A1 * | 4/2008 | King | 705/67 |
| 2008/0275779 A1 | 11/2008 | Lakshminarayanan | |
| 2008/0277465 A1 | 11/2008 | Pletz et al. | |
| 2009/0063312 A1 * | 3/2009 | Hurst | 705/30 |
| 2009/0287575 A1 * | 11/2009 | Galit et al. | 705/16 |
| 2009/0287577 A1 * | 11/2009 | Galit et al. | 705/17 |
| 2009/0287605 A1 * | 11/2009 | Galit et al. | 705/41 |
| 2010/0114779 A1 | 5/2010 | Noles | |
| 2010/0123003 A1 * | 5/2010 | Olson et al. | 235/380 |
| 2010/0153244 A1 * | 6/2010 | Sharma | 705/30 |
| 2010/0223152 A1 * | 9/2010 | Emerson et al. | 705/26 |
| 2010/0268647 A1 * | 10/2010 | Harris | 705/44 |
| 2011/0004527 A1 * | 1/2011 | Ash | 705/17 |
| 2011/0166992 A1 * | 7/2011 | Dessert et al. | 705/39 |
| 2011/0196753 A1 * | 8/2011 | Hodgdon et al. | 705/16 |
| 2011/0218871 A1 * | 9/2011 | Singh | 705/17 |
| 2011/0218907 A1 * | 9/2011 | Dessert et al. | 705/39 |
| 2011/0302089 A1 * | 12/2011 | McKenzie | 705/75 |
| 2012/0078749 A1 * | 3/2012 | Scipioni | 705/26.35 |

OTHER PUBLICATIONS

Katherine Morrall, Store Cards: Where the Card is King, Credit Card Mangement, vol. 5, Iss. 6, p. 12, Dated Sep. 1992, New York, 3 pages.

Ralph E. Spurgin, "Sopininmon!" Or What's Happening in Retail Credit Card Environment?, Credit World, Dated Mar. 1, 1997; 7 pages.

Paul M. Sherer, Deal and Deal Makers: Web Ventures Seek to Facilitate Business Credit, Private Equity, Wall Street Journal (Eastern Edition), p. C.26, Dated Nov. 8, 1999, New York, NY, 3 pages.

* cited by examiner

Chase Freedom® credit card

Congratulations, John Doe! You have been approved for the Chase Freedom credit card and awarded a temporary credit limit of $10,000.

Please find the cardmember agreement button below containing the electronic version of your cardmember agreement. Please review it and keep a copy for your records.

View Customer Cardholder Agreement

- Your new Chase Freedom credit card will be mailed to you within 7-10 business days.
- You can use your new card to pay for this purchase.
- You must wait until you receive your new credit card before you can use it for other purchases.

Please click the button below to return to the shopping cart and complete the transaction with your new temporary card.

Merchant X.com has only been provided with a portion of your Chase Freedom credit card account number. <u>In order to use the account number for this one-time purchase, you will need to enter the 4 digits below when prompted.</u> Please copy this number or write it down before leaving this page.

1234

Return to Shopping Cart

FIG. 3

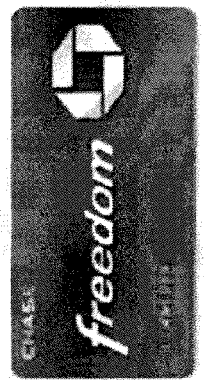

Congratulations, John Doe! You have been approved for the Chase Freedom credit card and awarded a temporary credit limit of $10,000.

Please find the cardmember agreement button below containing the electronic version of your cardmember agreement. Please review it and keep a copy for your records.

View Customer Cardholder Agreement x

- Your new Chase Freedom credit card will be mailed to you within 7-10 business days.
- You can use your new card to pay for this purchase.
- You must wait until you receive your new credit card before you can use it for other purchases.

By clicking on the button below, you authorize Chase to provide Merchant X.com with your complete account number to complete your purchase.

I authorize transmission of card information

FIG. 6

SYSTEM AND METHOD FOR UNIVERSAL INSTANT CREDIT

RELATED APPLICATION

This patent application is related to U.S. Provisional Patent Application Ser. No. 61/468,409, filed Mar. 28, 2011, the disclosure of which is incorporated by reference in its entirety.

BACKGROUND OF THE INVENTION

1. Field of the Invention

The present invention generally relates to instant credit, and, more particularly, to a system and method for universal instant credit.

2. Description of the Related Art

Regulation P (Privacy of Consumer Financial Information) prohibits a financial institution from providing non-partner merchants with consumer credit card account numbers. At the same time, credit card issuers do not want to provide all credit card account information to a customer at the time of approval. Because of these two issues, instant credit products are generally tied to co-branded relationships, so that an issuer can provide a co-brand partner with credit card information to complete an immediate transaction without providing the customer with account information.

SUMMARY OF THE INVENTION

Systems and methods for universal instant credit are disclosed. In one embodiment, a method of offering a financial instrument to a customer includes (1) using a computer processor, an issuer providing a customer with an application for a financial instrument; (2) the issuer receiving from the customer a completed application for the financial instrument; (3) using the computer processor, the issuer determining whether to approve the customer for the financial instrument; (4) using the computer processor, the issuer transmitting a first portion of an account identifier to a merchant; and (5) using the computer processor, the issuer transmitting a second portion of the account identifier to the customer. The financial instrument may be a credit card, a stored value card, a line of credit, etc.

In one embodiment, the method may further include completing the transaction using the account identifier. This may include receiving, from the merchant, the account identifier, wherein the second portion of the account identifier was provided to the merchant by the customer. It may also include receiving, from the merchant, the second portion of the account identifier, wherein the second portion of the account identifier was provided to the merchant by the customer.

When combined, the first portion of the account identifier and the second portion of the account identifier may constitute the account identifier. For example, in one embodiment, the first portion of the account identifier may comprise the first 12 digits of the account identifier, and the second portion of the account identifier may comprise the last 4 digits of the account identifier.

In one embodiment, the transaction may be an on-line transaction.

In one embodiment, the second portion of the account identifier may be transmitted to a web browser.

In one embodiment, the second portion of the account identifier may be transmitted as a SMS message, as an email, etc.

In one embodiment, the issuer may offer an incentive to the customer to apply or be issued the financial instrument. The incentive may be an account credit, a discount on a transaction, a discounted shipping incentive, a reduced interest rate incentive, a reward point incentive, etc.

The account identifier may expire after a predetermined number of uses, the passage of a predetermined amount of time, etc.

A method for completing a transaction according to another embodiment includes (1) an issuer receiving a request from a customer for a temporary account identifier to use in place of an actual account identifier; (2) using a computer processor, the issuer generating the temporary account identifier for the actual account identifier; (3) using a computer processor, the issuer transmitting a first portion of the temporary account identifier to a merchant; and (4) using the computer processor, the issuer transmitting a second portion of the temporary account identifier to the customer.

The method may further include completing the transaction using the temporary account identifier. This may include receiving, from the merchant, the account identifier, wherein the second portion of the temporary account identifier was provided to the merchant by the customer. The second portion of the account identifier may be provided to the merchant by the customer in person.

In one embodiment, the issuer may transmit the second portion of the temporary account identifier to the customer in a SMS message.

In one embodiment, the transaction may be an on-line transaction.

According to one embodiment, a transaction card system is disclosed. The system may include a processor; a memory; and a computer readable medium including a program for performing the following: (1) receive a completed application for a financial instrument from a customer; (2) determine whether to approve the customer for the financial instrument; (3) transmit a first portion of an account identifier to a merchant; and (4) transmit a second portion of the account identifier to the customer. When combined, the first portion of the account identifier and the second portion of the account identifier may constitute the account identifier;

In one embodiment, the first portion of the account identifier may comprises the first 12 digits of the account identifier, and the second portion of the account identifier may comprises the last 4 digits of the account identifier.

In one embodiment, the second portion of the account identifier may be transmitted in a SMS message, as an email, etc.

In one embodiment, the financial instrument may be a credit card, a stored value card, a line of credit, etc.

In one embodiment, the account identifier may expire after a predetermined number of uses, the passage of a predetermined amount of time, etc.

According to another embodiment, a method of offering a financial instrument to a customer is disclosed. The method includes (1) using a computer processor, an issuer providing a customer with an application for a financial instrument; (2) the issuer receiving from the customer a completed application for the financial instrument; (3) using the computer processor, the issuer determining whether to approve the customer for the financial instrument; (4) the issuer receiving from the customer authorization to transmit the account identifier to a merchant; (5) transmitting the account identifier to the merchant; and (6) completing the transaction.

In one embodiment, the step of receiving from the customer authorization to transmit the account identifier to a merchant may include transmitting a portion of an account identifier to the customer and receiving from the customer the portion of the account identifier. The portion the account identifier may be transmitted to the customer in a SMS message or in an email message.

In another embodiment, the step of receiving from the customer authorization to transmit the account identifier to a merchant may include transmitting a code to the customer and receiving the code from the customer.

In still another embodiment, the step of receiving from the customer authorization to transmit the account identifier to a merchant may include receiving, from the customer, an indication of authorization for the issuer to transmit the account identifier to the merchant.

In one embodiment, the transaction may be an on-line transaction.

In one embodiment, the account identifier may expire after at least one of a predetermined number of uses and a passage of a predetermined amount of time.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is a screenshot of an example approval screen according to one embodiment of the invention;

FIG. 6 is a screenshot of an example approval screen according to one embodiment of the invention;

DETAILED DESCRIPTION OF PREFERRED EMBODIMENTS

Figure 1:
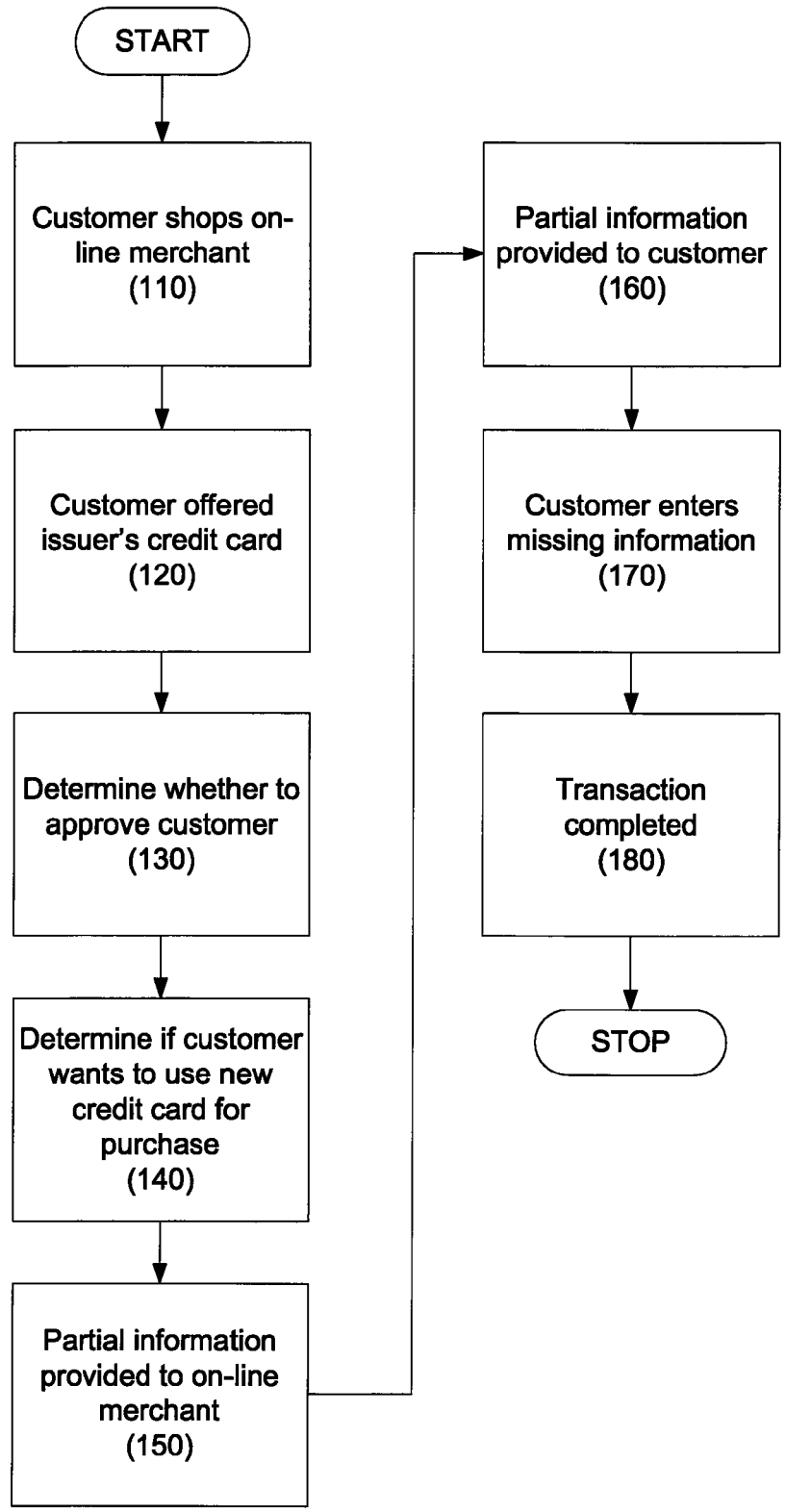
FIG. 1 is a flowchart depicting a method of using universal instant credit according to one embodiment of the invention.

Several embodiments of the present invention and their advantages may be understood by referring to FIGS. 1-9, wherein like reference numerals refer to like elements.

The disclosures of U.S. Pat. Nos. 5,870,721; 5,940,811; 6,105,107; and 7,370,004, and U.S. patent application Ser. No. 11/610,289 are all incorporated by reference in their entireties.

While the present invention may be described in the context of credit cards, it should be recognized that it has broad applicability. Any suitable transaction accounts, including credit, debit, stored value, pre-paid, etc. may be used as necessary and/or desired.

While conducting on-line transactions with the partner of a credit card issuer, a customer may be offered, for example, a co-branded credit card (co-branded by the issuer and the partner) that the customer may apply for, and be approved for a card, "instantly." In the context of the present disclosure, "instant" does not require immediate approval. The approval may be within a short period of time, within a single browsing session, before the completion of a transaction (on-line or in-person), etc.

In one embodiment, "instant" may refer to the ability to use the account without receiving a physical transaction device (e.g., a credit card).

If approved, the customer can use the new credit to complete the purchase with the partner.

The customer, however, may not want a co-branded credit card, but may instead prefer a card that may provide rewards and/or other features that the customer may find more desirable. The customer may even want a card that is co-branded with a merchant other than the merchant that it is conducting the transaction with so it can, for example, receive airline miles for making a shoe purchase. Further, the customer may still want to complete the transaction with the new credit or financial instrument.

Referring to FIG. 1, a method for universal instant credit according to one embodiment is disclosed. In step 110, the customer browses a website for an on-line merchant to make an on-line purchase. In one embodiment, the customer may also make a catalog purchase, and call a voice response system to make a purchase. In still another embodiment, the customer may make an in-person purchase.

In another embodiment, the customer may access a non-merchant website, such as a news website, an auction website, an online shopping mall, an on-line classified website, etc.

In step 120, the customer may be offered a credit card with the credit card issuer. In one embodiment, this may be branded by only the issuer; in another embodiment, it may be a co-branded card with a partner of the issuer other than the on-line merchant.

Other accounts may be offered to the customer as necessary and/or desired.

In one embodiment, the customer may be presented with the offer during the "checkout" or payment phase of the transaction. In another embodiment, the offer may be presented at any phase of the browsing. The offer may be presented in a pop-up window, on a banner, in other space on the webpage, by email, by text message, by instant messaging, by social networking (e.g., Facebook, Twitter, Four Square), etc.

Any suitable method for presenting the offer to the customer may be used as necessary and/or desired.

In one embodiment, the offer may be presented with a hyperlink to the issuer's website.

In one embodiment, the customer may be offered an incentive for applying and/or receiving the credit card. For example, the issuer may offer the customer a credit or reward on his or her credit card, free shipping on the purchase, a discount on the purchase, a coupon, reward account points, airline miles, etc. Any suitable incentives may be used as necessary and/or desired.

In step 130, if the customer decides to apply, the customer may complete an on-line credit card application. In one embodiment, this may be completed by the customer clicking on a hyperlink, and being redirected to the issuer's website. The customer may then complete an application for the credit card.

In another embodiment, an on-line credit card application may be presented in a pop-up window.

In one embodiment, certain information may be transmitted from the on-line merchant to the issuer to pre-populate fields of the application. For example, if the customer has logged in with the on-line merchant, the customer's name, address, email address, phone number, etc. may be transmitted from the on-line merchant to the issuer. The customer may modify this information as necessary and/or desired.

After receiving the completed application, the issuer may determine whether to approve the customer, and the terms and conditions on that approval (e.g., credit limit, etc.). Any suitable approval process may be used as necessary and/or desired.

In one embodiment, the approval may be communicated to the customer, along with the terms and conditions on that approval.

In one embodiment, if the customer is not approved, the customer may be informed that his or her application is being "pended" or "held" and that decision will be delivered by, for example, mail, email, etc. separately. In another embodiment, the customer may be informed that his or her application was rejected in, for example, real time.

In step 140, if the customer is approved, the customer may be asked whether or not the customer wants to use the new credit card to complete the purchase. If the customer wishes to use this credit card, in step 150, partial information on the credit card may be provided to the on-line merchant, while in step 160, partial information on the credit card may be provided to the customer.

In one embodiment, the on-line merchant may be provided with 12 of the 16 digits for a standard credit card number. In another embodiment, for example, with an American Express® card, 10 of the 15 digits may be provided. Further, the digits may be consecutive or nonconsecutive and may be located anywhere within the account number. Greater or fewer numbers may be provided as necessary and/or desired.

The on-line merchant may also be provided with the customer's name, the credit card's expiration date, the card verification value (CVV), etc.

The customer may be provided with some or all of the credit card information. In one embodiment, the customer may be provided with the digits that were not provided to the on-line merchant. For example, if the on-line merchant was provided with the first 12 digits, the customer would be provided with the last four digits. Between the on-line merchant and the customer, all information necessary to complete the transaction with the new credit card is available.

In one embodiment, the digits provided to the customer in the partial information may be different from the digits of the actual credit card and may be, for example, a temporary code. For example, the digits presented as the last 4 may not be the actual last 4 digits for the credit card.

In one embodiment, the customer is not provided with all credit card information until the customer receives the physical device.

In one embodiment, the customer may be provided with this information on a webpage, in a pop-up window, in an instant message, or in an email. In another embodiment, a text message (SMS) containing the information may be sent to the customer's mobile device. For example, the information may be provided to the customer's mobile phone, PDA, laptop computer, netbook, tablet computer, eReader, pager, etc. Other methods of providing the information, including by facsimile, voice message, instant message, mail, customer representative call, etc. may be used as necessary and/or desired.

The customer may also be provided with the information on the approval screen. An example of such approval screen, according to one embodiment, is shown in FIG. 3.

If the customer does not wish to use the credit to complete the purchase, the customer may enter other payment information during check-out.

In another embodiment, the customer may be able to use the credit to complete a later transaction, or to compete another transaction. For example, the customer may change his or her mind, and decide not to complete the current transaction with the credit card. Instead, the customer may indicate that he or she wishes to use the card for a different transaction, at a later time, etc. For example, in one embodiment, a virtual wallet may be used to store the card information, whereby all card information may not be disclosed to the customer that time. In one embodiment, customer consent may be required to disclose the account information to the next merchant.

Referring again to FIG. 1, in step 170, the customer may provide the missing information (i.e., the information that was transmitted to the customer but not to the merchant) to the on-line merchant. In one embodiment, the customer may simply click a button to transmit the missing information to the on-line merchant. In another embodiment, the customer may physically enter the missing information into, for example, a text box on the on-line merchant's website (e.g., at a checkout page).

As an example, in one embodiment, the issuer sends the first 12 digits of the account number and the expiration date to the on-line merchant. The on-line merchant may populate the 12 digits in the account number field for the issuer's card but may mask the numbers to the customer. For example, the account number may be displayed as follows: Account #XXXX-XXXX-XXXX-_____.

In one embodiment, the customer may not be able to delete or change the masked 12 digits or the expiration date.

The last 4 digits of the account number may be provided to the customer on the approval screen. The customer may populate the last 4 digits of account number after the first 12 digits provided to the on-line merchant. For example: XXXX-XXXX-XXXX-1234.

In another embodiment, the customer may send the missing information in a separate transmission, or using a different communication channel, to the on-line merchant by email, text message, phone (e.g., voice response system), etc. The merchant may populate the missing data field with this data once the information is received, may inform the customer that the information is received, etc.

In still another embodiment, the customer may authorize the transmittal of all credit card information to the on-line merchant by clicking a button.

In step 180, the transaction may be completed as normal.

Figure 2:
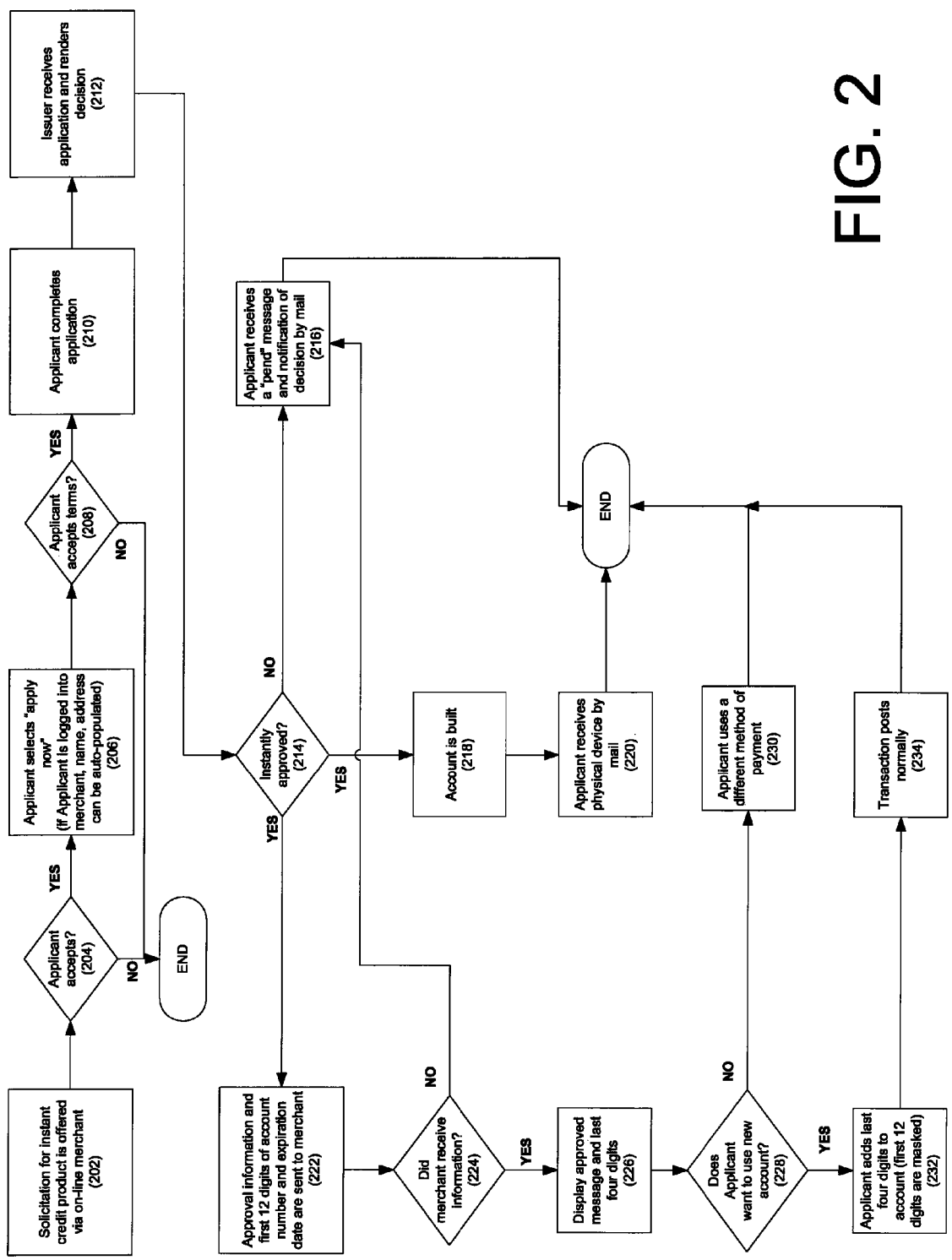
FIG. 2 is a flowchart depicting a method of using universal instant credit according to one embodiment of the invention.

Referring to FIG. 2, an example of an instant credit process according to one embodiment is disclosed.

In step 202, a customer receives a solicitation from, for example, an on-line merchant. As discussed above, the solicitation may be in the form of an offer at checkout, on a banner, as a hyperlink, etc.

In step 204, if the applicant declines the offer, the process stops. If the applicant accepts the offer, the applicant may do so by, for example, in step 206 selecting an "Apply Now" button on the webpage.

In one embodiment, the on-line merchant may provide applicant information (e.g., name, address, phone number, email address, etc.) if known.

In step 208, the applicant may be presented with terms and conditions for the application. In one embodiment, these terms and conditions may be standard terms and conditions that accompany a credit card application.

In step 210, the applicant may complete the application.

In step 212, the issuer receives and processes the application, and renders a decision. In one embodiment, the decision process may be any suitable decision process involving, for example, checking a credit report, verifying income, residency history, verifying personal information, etc.

An example of a decision process is described in U.S. Pat. No. 6,202,053, the disclosure of which is incorporated by reference in its entirety.

In step 214, if the applicant is not approved (e.g., the application is declined, a decision could not be rendered, etc.) a "hold" or "pend" message may be displayed. In one embodiment, the message may inform the applicant that a decision could not be rendered at this time, and a decision will be forthcoming by, for example, regular mail.

In another embodiment, if the application is rejected, in step 216, the applicant may be displayed a message indicating such.

If, in step 214, the application is approved, in step 218, the issuer builds an account, and, in step 220, delivers the device to the applicant by mail. Any suitable device may be provided, including a credit card, an adhesive card, a virtual card, a fob, a RF device, SIM card, etc.

In one embodiment, an electronic file representing the credit card may be provided to the applicant by, for example, email, ftp site, secure download, etc.

In step 222, a portion of the credit card account number may be transmitted to the on-line merchant. In one embodiment, this may include the first 12 digits of a credit card number, an expiration date, etc. Other information may be transmitted to the on-line merchant as necessary and/or desired.

In step 224, the system may check to verify that the merchant received the portion of the credit card account number. In one embodiment, if the merchant did not receive the information, the applicant may receive a "pend" message, a "cannot be completed at this time" message, or a similar message.

In step 226, remaining account information may be displayed for the applicant. In one embodiment, this may include the last four digits of the credit card number. Other information may be displayed as necessary and/or desired.

In one embodiment, the remaining account information may be transmitted to the applicant by a different communication channel, such as by text message, email, voice mail, facsimile, etc.

In one embodiment, the applicant may be instructed to note the information that is displayed so it can be entered during the on-line merchant's checkout process. This may include recommending that the applicant write down the information, asking the applicant if the applicant would like the information transmitted by SMS, email, displayed in a separate window (such as a pop-up window), etc.

In step 228, the applicant may be asked whether or not the new account should be used to complete the transaction. This inquiry may be made at any point in the purchase process.

In step 230, if the applicant does not wish to use the new account, in step 230, the applicant may complete the transaction using a different method of payment.

If the applicant wishes to complete the transaction using the new account, in step 232, the applicant may provide the remaining account information to the on-line merchant.

In one embodiment, the applicant may physically enter the remaining account information into a form on the on-line merchant's website. In another embodiment, the applicant may authorize the remaining account information to be transmitted by the issuer to the on-line merchant.

In step 234, the transaction may be completed by the on-line merchant and posts normally.

In one embodiment, the on-line merchant may transmit all account information to complete the transaction.

Figure 4:
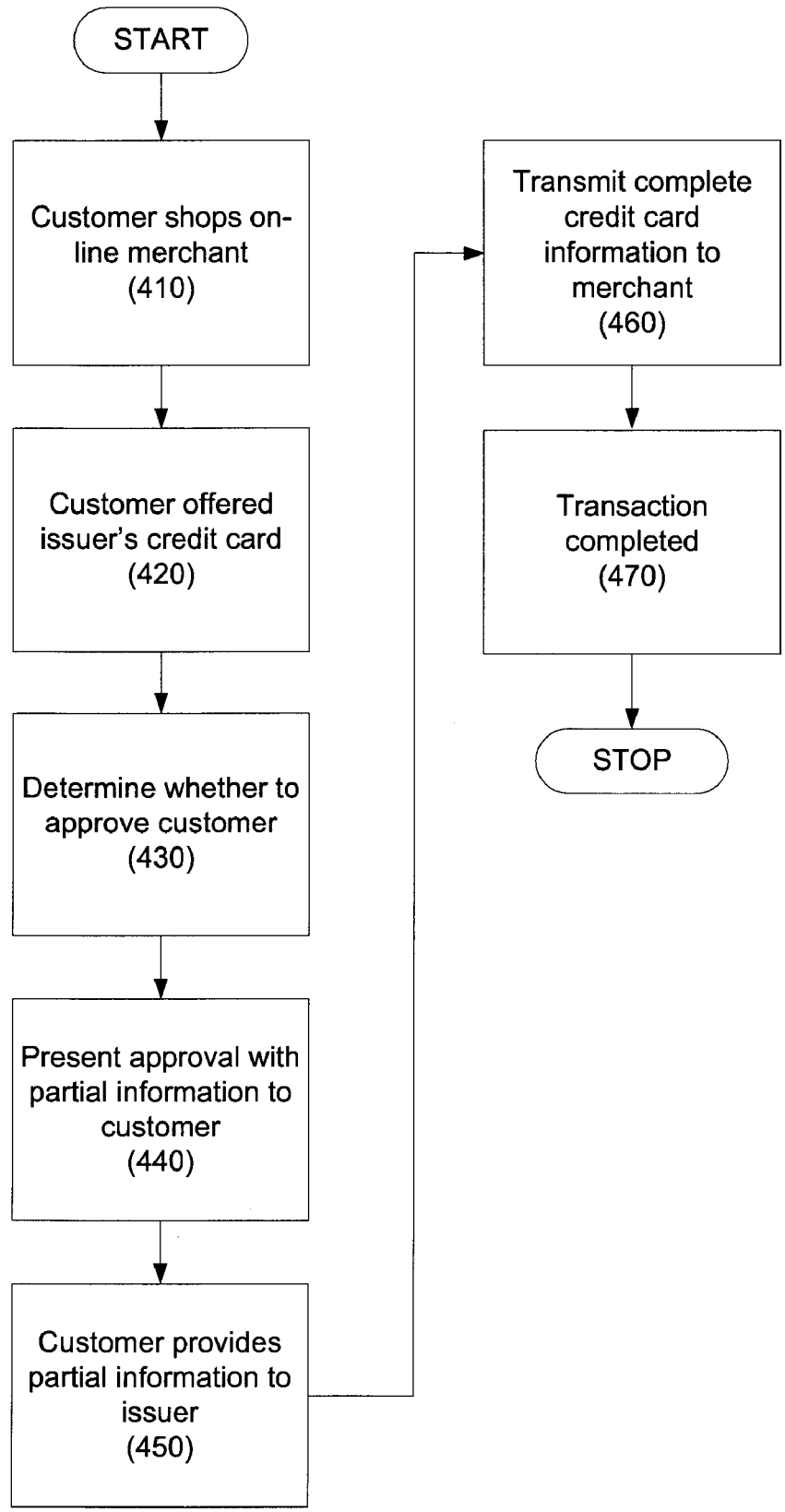
FIG. 4 is a flowchart depicting a method of using universal instant credit according to one embodiment of the invention.

Referring FIG. 4, a method for universal instant credit according to one embodiment is disclosed. Steps 410, 420, and 430 may correspond to step 110, 120, and 130, respectively.

In step 440, if the customer is approved, the customer may be presented with partial information on the credit card. For example, as discussed above, the customer may be presented with the last 4 digits of a credit card number. In another embodiment, the customer may be provided with other digits (e.g., the first 4, last 3, middle 4, etc.).

Any suitable number and/or position of digits may be provided/used as necessary and/or desired.

In one embodiment, the digits presented in the partial information may be different from the digits of the actual credit card and may be, for example, a temporary code. For example, the digits presented as the last 4 may not be the actual last 4 digits for the credit card.

In one embodiment, the customer may be provided with this information on a webpage, in a pop-up window, in an instant message, or in an email. In another embodiment, a text message (SMS) containing the information may be sent to the customer's mobile device. For example, the information may be provided to the customer's mobile phone, PDA, laptop computer, netbook, tablet computer, eReader, pager, etc. Other methods of providing the information, including by facsimile, voice message, instant message, mail, customer representative call, etc. may be used as necessary and/or desired.

In one embodiment, the approval screen may instruct the customer that by entering the digits into a text box, the customer is authorizing the transmission of all credit card information to the merchant so that the transaction can be completed. For example, if the customer is provided with the digits "1234," the customer may enter these digits in a box that may be provided on the approval screen.

Figure 5:
FIG. 5 is a screenshot of an example approval screen according to one embodiment of the invention.

An example approval screen is provided in FIG. 5.

In step 450, the customer may enter the partial information. In one embodiment, this may be entered into a box on the approval screen. The customer may also be required to click on a button to authorize transmission of the full credit card information to the merchant.

In step 460, the issuer transmits complete credit card information to the merchant, and, in step 470, the transaction may be completed.

In another embodiment, the customer may not be presented with partial information before authorizing transmission of the credit card information to the merchant. The customer may only be required to authorize transmission by clicking a button. In one embodiment, the customer may be requested and/or required to perform other actions, including, for example, reviewing a disclosure, providing a digital signature, entering his or her initials, confirming through a SecureId device, confirming through a separate communication (e.g., SMS, email, voice, VRU, etc.).

An example approval screen according to another embodiment is provided as FIG. 6.

Figure 7:
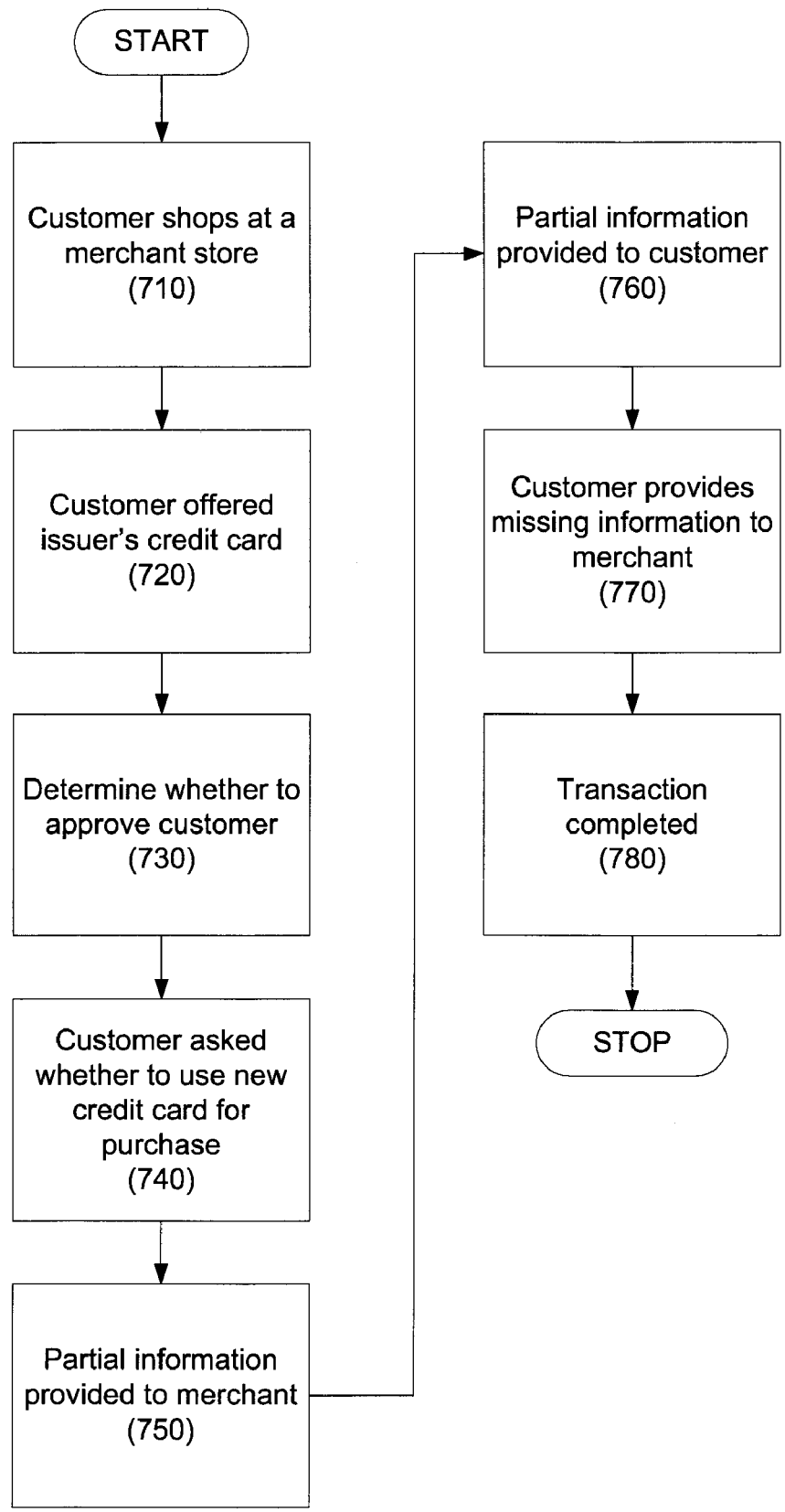
FIG. 7 is a flowchart depicting a method of using universal instant credit according to one embodiment of the invention.

In one embodiment, the present invention may be used to complete in-person transactions. Referring to FIG. 7, a flowchart depicting a method of using universal instant credit according to one embodiment of the invention is provided. The method depicted in FIG. 7 may have particular applicability for purchases that are not made on-line, such as in-person purchase, telephonic purchases, etc.

In step 710, the customer may shop at a merchant's store or may make a telephone order. For example, a customer shopping at a merchant may be offered a credit card during checkout. In another embodiment, the customer may respond to an offer made at some other time, such as a mailing, an email, etc. but may not decide to apply until the time of purchase.

The customer may apply on-line, for example, using an application, website, etc. In one embodiment, the merchant may provide kiosks. In another embodiment, the merchant may provide an application process as part of its check-out.

In one embodiment, the customer may provide identifying information for the merchant.

In step 720, the customer may be offered the issuer's credit card. In one embodiment, the issuer's representative may be present in person to make the offer. In another embodiment, flyers or other information about the credit card may be present. In still another embodiment, the offer may be made during check-out, such as by a store clerk, by a message on a point of sale device, etc.

In step 730, similar to step 130, if the customer decides to apply, the customer may complete an on-line credit card application.

In step 740, the customer may be asked whether or not to use the new credit card for the purchase. In one embodiment, this may be asked at the same time as the offer.

In step 750, if the customer wishes to use this credit, similar to step 150, partial information on the credit card may be provided to the merchant. In one embodiment, the issuer may provide the partial information in an electronic message, e.g., an email, a text message, an instant message, a facsimile, a closed communication link, a push message, by a voice response unit, by an automated call, etc. In another embodiment, the issuer may provide the partial information by telephone. Any other means for providing the partial information may be used as necessary and/or desired.

In one embodiment, the issuer may provide the merchant with 12 of the 16 digits for a standard credit card number. Greater or fewer numbers may be provided as necessary and/or desired. The merchant may also be provided with the customer's name, the credit card's expiration date, the Card Verification Value, etc.

In step 760, similar to step 160, partial information on the credit card may be provided to the customer. In one embodiment, the partial information may be sent by, for example, an email, a text message, an instant message, a voice message, a phone call, etc.

The customer may be provided with some or all of the credit card information. In one embodiment, the customer may be provided with the information that was not provided to the merchant (e.g., the 4 digits that were not provided to the merchant), so that between the on-line merchant and the customer, all information necessary to complete the transaction with the new credit card is available.

In another embodiment, the customer may authorize the issuer to provide all necessary information to the merchant to complete the transaction.

In step 770, similar to step 170, the customer may provide the missing information (i.e., the information that was transmitted to the customer but not to the merchant) to the line merchant. In one embodiment, the customer may verbally inform the merchant of the missing information, may enter the missing information into a keypad on a point of sale device, etc. Any suitable mechanism for providing the missing information to the merchant may be used as necessary and/or desired.

In step 780, similar to step 180, the transaction is completed as normal.

Figure 8:
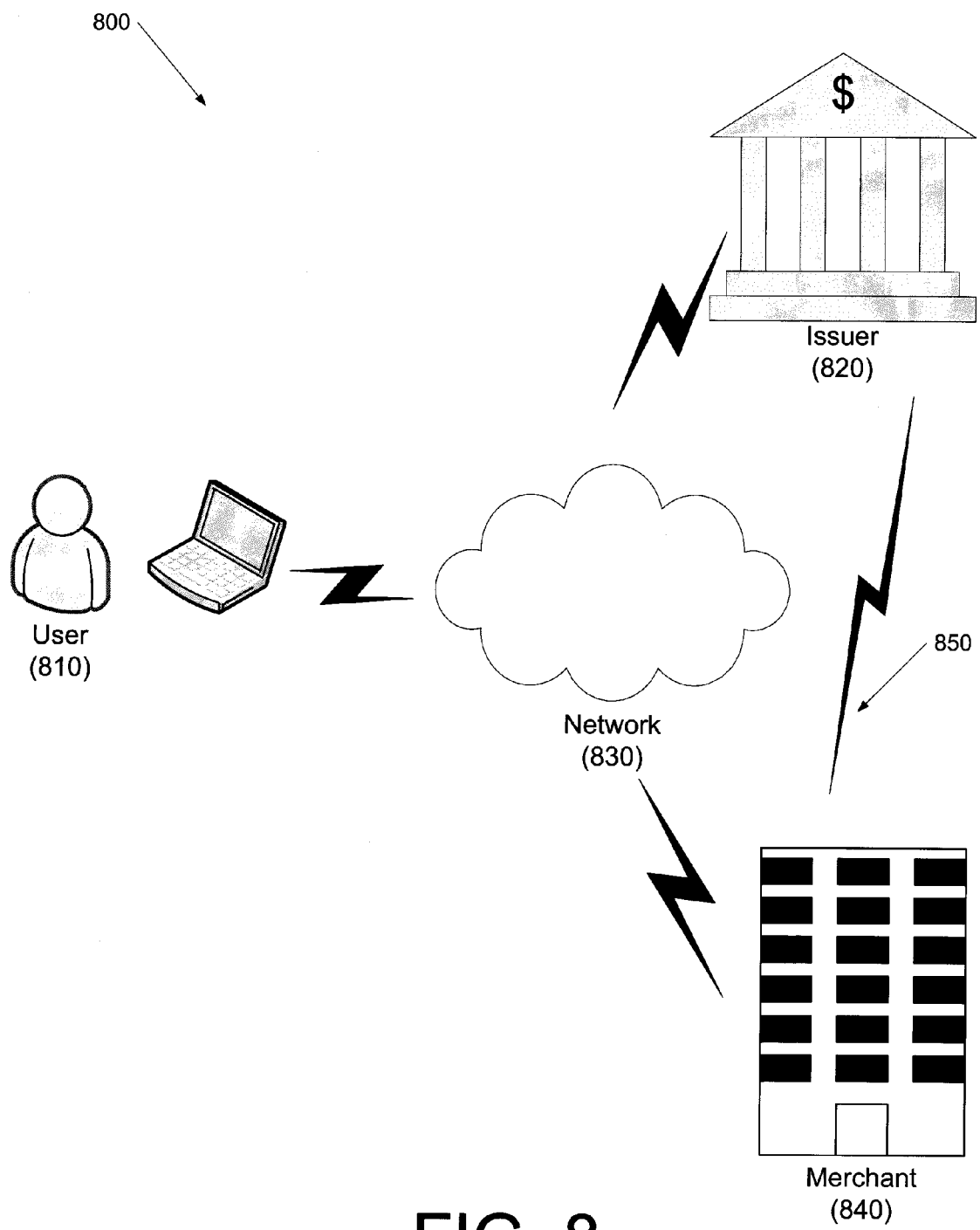
FIG. 8 is a block diagram of a system for using universal instant credit according to one embodiment of the invention.

Referring to FIG. 8, a block diagram of a system for using universal instant credit according to one embodiment of the invention is provided. System 800 may include user 810, issuer 820, network 830, and merchant 840. In one embodiment, merchant 840 may be an on-line merchant. In another embodiment, merchant 840 may be a brick and mortar merchant.

In one embodiment, merchant 840 may be any suitable merchant that sells and/or markets goods and/or services. In another embodiment, merchant 840 may simply be a website, and may not market any goods or services.

Merchant 840 may further host or provide a kiosk (not shown) for user 810 to apply for a credit card from issuer 820. In another embodiment, merchant 840 may host or provide a representative, agent, employee, etc. (not shown) for issuer 820.

User 810 may access merchant 840 using a computer (e.g., desktop, laptop, tablet, PDA, cell phone, etc.), by telephone, or by physically visiting one of merchant's stores. User 810's computer may connect with a website for merchant 840 by network 830, which may be, for example, the Internet.

In one embodiment, an application (such as an iPad app, an Android app, etc.) may be provided whereby the transaction can be completed.

Issuer 820 may be any suitable financial institution or financial services company that issues or manages credit cards, debit cards, stored value cards, pre-paid cards, etc. In one embodiment, issuer 820 may be a bank. In another embodiment, issuer 820 may be a credit union.

Issuer 820 and merchant 840 may communicate via network 830. In another embodiment, issuer 820 and merchant 840 may communicate by, for example, secondary network 850, which may be provided in addition to, or in place of, network 830. Secondary network 850 may be, for example, a credit card network, such as those used with Visa, MasterCard, American Express, Discover, debit cards, private label, etc.

In one embodiment, the present invention may be used by a customer to arrange for a purchase with an on-line merchant and pick-up the merchandise in person (e.g., at the merchant's store). For example, the customer may apply for instant credit as discussed above, and the merchant may be provided with part of the credit card information. When the customer arrives to pick up the item, the customer may then provide the missing information and complete the transaction.

In another embodiment, customers may be offered instant credit when conducting transactions at, for example, an ATM. For example, a customer using an issuer's ATM may be offered a credit card. If the customer is already a customer of the issuer, the customer may only need to authorize the issuer to issue a card as the necessary information to apply for a credit card may already be in the issuer's possession. If the customer is not already a customer of the issuer, the customer may complete an application at the ATM, have the application link emailed to them for completion at a later time, etc.

In another embodiment, the invention may be used to generate a temporary (limited use or single-use) account number for already-existing accounts. For example, rather than have a cardholder enter his or her actual card number to complete a transaction, in one embodiment, a temporary card number is generated for the customer to use. This number may be a random number, a rotating number, etc. The temporary number may not be, and preferably is not, the cardholder's actual card account number. The temporary account number may also have the same, or a different number of digits, from the actual card number. The card number may include numbers, letters, characters, symbols, graphics, etc.

The disclosures of U.S. Pat. Nos. 6,029,890, 5,883,810, 6,000,832, 6,227,447 and 7,103,576 are incorporated by reference in their entireties.

In one embodiment, the temporary account number may expire after a predetermined number of uses, such as a single use, multiple uses, etc. In another embodiment, temporary account number may expire after a predetermined period of time, e.g., 1 hour, 1 day, 1 month, etc. In still another embodiment, the temporary account number may expire based on a combination of a predetermined number of uses and/or a predetermined number of time.

Other ways for expiring the temporary account number may be used as necessary and/or desired.

In one embodiment, the temporary account number may be used with any suitable financial account, including a credit account, a debit account, a checking account, a savings account, a stored value account, etc.

Figure 9:
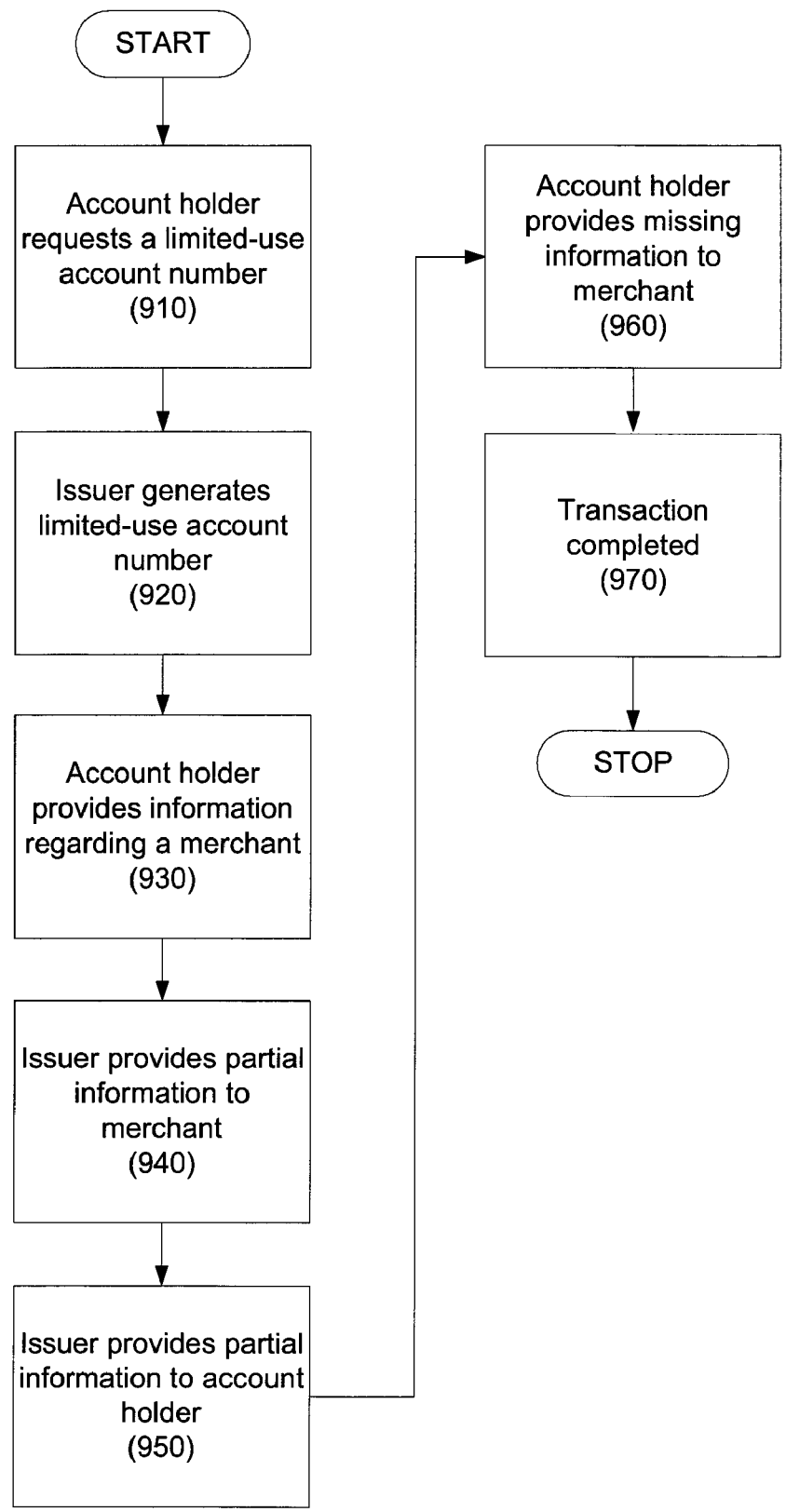
FIG. 9 is a flowchart depicting a method of using a temporary account number according to one embodiment of the invention.

Referring to FIG. 9, a flowchart depicting a method of using a temporary account number according to one embodiment of the invention is provided. In step 910, the account holder requests the generation of a temporary account number. In one embodiment, the account holder may specify an expiration period for the temporary account number.

In step 920, the issuer generates a temporary account number for the account holder.

In step 930, the account holder provides information regarding the merchant with which it is to use the temporary account number. In one embodiment, this may be done on-line, over the phone, etc. In one embodiment, the account holder may provide identifying information for the merchant.

In step 940, if the merchant has been sufficiently identified, the issuer may provide partial information for the temporary account number to the merchant. This may be in the manner discussed above. For example, a first portion of the temporary account number may be transmitted to the merchant.

In step 950, the issuer may provide the second portion of the temporary account number to the card holder. In one embodiment, this may be performed as discussed above, for example, in steps 160, 226, 760, etc. In one embodiment, in order to increase security, the second portion may be transmitted to a verified address for the card holder, such as by SMS to the card holder's registered mobile phone, to a confirmed email address, etc.

In step 960, the cardholder may then enter the second part into the merchant's system to complete the transaction.

In step 970, the transaction is completed. In one embodiment, this may involve verifying that the temporary account number has not expired, determining the actual account from the temporary account number, etc.

In one embodiment, the account holder may be required to enter additional information when conducting the transaction. For example, the account holder may be required to enter a personal identification number (PIN), personal identification entry (PIE), an alias for the account, a password, an authentication number (e.g., a number from a RSA SecureID token), or other challenge information (e.g., mother's maiden name, first car, favorite sports team, etc.). Other verification information may be used as necessary and/or desired.

The disclosures of U.S. Pat. Nos. 6,341,724 and 7,103,576 are incorporated by reference in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for conducting a transaction with a financial instrument having an account identifier, the account identifier having a first portion and a second portion, comprising:
   receiving, by one or more computer processors of an issuer, from a customer, a completed application for the financial instrument;
   determining, by the one or more computer processors of the issuer, whether to approve the customer for the financial instrument;
   when the customer is approved for the financial instrument:
      transmitting, by the one or more computer processors of the issuer, a first portion of an account identifier to a merchant; and
      transmitting, by the one or more computer processors of the issuer, a second portion of the account identifier to the customers;
      wherein the first portion of the account identifier and the second portion of the account identifier, when combined, constitute the account identifier; and
   receiving, by the one or more computer processors of the issuer, from the merchant, the account identifier, wherein the second portion of the account identifier was provided to the merchant by the customer.

2. The method of claim 1, wherein the first portion of the account identifier comprises a first 12 digits of the account identifier.

3. The method of claim 1, wherein the second portion of the account identifier comprises a last 4 digits of the account identifier.

4. The method of claim 1, further comprising: completing the transaction using the account identifier.

5. The method of claim 4, wherein the transaction is an on-line transaction.

6. The method of claim 1, wherein the second portion of the account identifier is transmitted to a web browser.

7. The method of claim 1, wherein the second portion of the account identifier is transmitted in a SMS message.

8. The method of claim 1, wherein the second portion of the account identifier is transmitted as an email.

9. The method of claim 1, wherein the financial instrument is one of a credit card, a stored value card, and a line of credit.

10. The method of claim 1, further comprising:
    the issuer offering an incentive to the customer to apply or be issued the financial instrument.

11. The method of claim 10, wherein the incentive is one of an account credit, a discount on a transaction, a discounted shipping incentive, a reduced interest rate incentive, and a reward point incentive.

12. The method of claim 1, wherein the account identifier expires after at least one of a predetermined number of uses and a passage of a predetermined amount of time.

13. A system for conducting a transaction with a financial instrument having an account identifier, the account identifier having a first portion and a second portion, comprising:
    one or more computer processors of an issuer configured to;
       receive, from a customer, a completed application for a financial instrument;
       determine whether to approve the customer for the financial instrument;
       when the customer is approved for the financial instrument:
          transmit a first portion of an account identifier to a merchant;
          transmit a second portion of the account identifier to the customer,
          wherein the first portion of the account identifier and the second portion of the account identifier, when combined, constitute the account identifier; and
       receive, from the merchant, the account identifier, wherein the second portion of the account identifier was provided to the merchant by the customer.

14. The system of claim 13, wherein the first portion of the account identifier comprises a first 12 digits of the account identifier, and the second portion of the account identifier comprises a last 4 digits of the account identifier.

15. The of claim 13, wherein the second portion of the account identifier is transmitted in a SMS message.

16. The of claim 13, wherein the second portion of the account identifier is transmitted as an email.

17. The system of claim 13, wherein the financial instrument is one of a credit card, a stored value card, and a line of credit.

18. The system of claim 13, wherein the account identifier expires after at least one of a predetermined number of uses and a passage of a predetermined amount of time.

19. The system of claim 13, wherein the one or more computer processors of the issuer are further configured to offer an incentive to the customer to apply or be issued the financial instrument.

20. The system of claim 19, wherein the incentive is one of an account credit, a discount on a transaction, a discounted shipping incentive, a reduced interest rate incentive, and a reward point incentive.

* * * * *